Dec. 27, 1966 R. B. DOWNEY 3,294,538
LIQUID TRAPPING MEANS FOR A FILM PACK
Filed June 14, 1963 4 Sheets-Sheet 1

INVENTOR.
Rogers B. Downey
BY Brown and Mikulka
and
Robert M. Ford
ATTORNEYS

FIG. 2

Dec. 27, 1966   R. B. DOWNEY   3,294,538
LIQUID TRAPPING MEANS FOR A FILM PACK
Filed June 14, 1963   4 Sheets-Sheet 4

INVENTOR.
Rogers B. Downey
BY Brown and Mikulka
and
Robert M. Ford
ATTORNEYS

Patented Dec. 27, 1966

3,294,538
LIQUID TRAPPING MEANS FOR A FILM PACK
Rogers B. Downey, Lexington, Mass., assignor to Polaroid Corporation, Cambridge, Mass., a corporation of Delaware
Filed June 14, 1963, Ser. No. 288,012
6 Claims. (Cl. 96—76)

This invention relates to photographic products and, more particularly to novel photographic film units.

The present invention is concerned with photographic film units particularly adapted for employment in a photographic film pack or film magazine of the type shown in U.S. Patent No. 3,080,805, issued March 12, 1963, in the named of Joel A. Hamilton, comprising a container, at least one film unit mounted for exposure within the container and a closure element for preventing the admission of light into the container. As disclosed in that patent, each film unit includes, in combination, a first photosensitive element positioned for exposure within the container; a second nonphotosensitive element, preferably a print-receiving element, adapted to be superposed with the photosensitive element during withdrawal of the film unit from the container, following exposure thereof; and frangible container means particularly adapted to releasably retain a fluid processing composition for distribution between the superposed photosensitive and print-receiving elements subsequent to photoexposure of the film unit.

In general, the film pack or container includes an exposure aperture adapted to permit exposure of the photosensitive element; a removable closure element located across the exposure aperture; at least one film unit; and an opening permitting withdrawal of the closure element and film units from the container successively through this opening. The closure element and each film unit includes a leader adapted to project from the film pack through the opening whereby to provide means for selectively withdrawing the closure element, or a film unit, from the film pack into contact, and in engagement with means adapted to provide individual distribution of the retained fluid processing composition, between superposed photosensitive and nonphotosensitive elements.

Film packs of this type are intended to be employed in photographic apparatus, such as a camera, which include means for maintaining a film pack in position for exposure, means for selectively exposing the photosensitive element of successive film units of the pack, and means for engaging each film unit during withdrawal from the pack, subsequent to photoexposure, and distributing the retained processing fluid between, and in contact with, the contiguous photosensitive and print-receiving elements of the film unit, for effecting photographic diffusion transfer processing of the respective, photoexposed film unit. Processing of each film unit may thus be effected manually by grasping a leader attached to the film unit and withdrawing the leader and film unit from both the pack and the camera.

In photographic diffusion transfer processing, the photosensitive sheet element is normally first exposed and then biased into superposed relationship with a second sheet element, which is, in general, photographically inert and aids in the controlled distribution of the processing composition. The photosensitive element may contain an integral print-receiving stratum or, most preferably, the second sheet element comprises a transfer image-receiving element. The contiguous sheet elements are moved relative to, and between, a pair of suitably opposed members such as gapped parallel pressure rollers or platens. Application of pressure to the frangible fluid retaining means effects controlled rupture thereof and predetermined unidirectional distribution of its processing composition contents between, and in contact with, the opposed surfaces of the superposed elements. Subsequent to transfer processing, the image-carrying area of the print-receiving element may be separated from the laminate.

In order to insure that the predetermined area to be processed is completely covered by the fluid processing composition, in the desired layerwise thickness, it is necessary to supply an amount in excess of the minimum amount of fluid required to provide these desired parameters. For this reason, some means must be provided to trap and retain fluid, which is in excess and highly caustic, subsequent to distribution of the processing composition, in order to prevent its undesired escape from the lamination within and/or without the camera apparatus.

In order to prevent this processing composition overrun, it has been heretofore taught that the trailing portions of the respective sheet elements may be elongated and that a pair of spacing elements, typically comprising hard rubber or plastic generally rectangular projections of sufficient length to equal the necessary elongation of the respective sheet element and to provide a fluid reservoir, may be adhered to the lateral edge of, most preferably, the print-receiving sheet element. As the trailing portions of the sheet elements, in superposed relationship with the spacing elements separating opposed surface contact, are drawn between the pressure-applying members during distribution of the processing composition, the spacing elements force a release in the compressive force provided by the opposed pressure-applying members. The excess processing fluid, rather than being further advanced, is thus collected and retained in the space formed between the superposed elongated trailing portions of the elements. The extent that the respective trailing edges are elongated is dependent on both the amount and the distribution of the excess fluid and must be of sufficient length to retain all excess fluid forced beyond the distal edge of the laminate area to be processed.

As will be appreciated from the preceding description, the highly caustic processing composition is present in what is, in fact, an open end of the laminate, and the only force holding the trailing edges of the laminate together, during and subsequent to processing, is the adhesive capacity of the fluid composition overrun. The presence of an open trailing edge in the laminate provides the singular disadvantages in that the caustic fluid processing composition is much too accessible to discharge from the laminate, to the detriment of persons and objects with which it comes in contact and the fact that the length of the film unit, and generally film packs and cameras employing same, must be increased in size in order to accommodate the elongations necessary to retain the fluid composition overrun, with the resultant increase in their various manufacturing costs.

Objects of the present invention are therefore to provide a novel and improved film unit, particularly adapted for employment in a film pack, which comprises, in combination, a first photosensitive sheet element; a second sheet element; a rupturable container adapted for unidirectional release of a retained fluid processing composition for selective distribution between and in contact with opposed surfaces of said first and said second sheet elements; and positive trapping or retaining means integral the distal or trailing edge of said second sheet and adapted to retain fluid processing composition overrun.

Other objects of the invention will in part be obvious and will in part appear hereinafter.

The invention accordingly comprises the product possessing the features, properties and the relation of components which are exemplified in the following detailed disclosure, and the scope of the application of which will be indicated in the claims.

For a fuller understanding of the nature and objects of the invention, reference should be had to the following detailed description taken in connection with the accompanying drawings wherein.

In accordance with the present invention, the preferred form of the film unit comprises a photosensitive sheet adapted to be exposed for producing a photographic image; a second or print-receiving sheet for carrying a positive transfer image; a rupturable container of a fluid agent for reacting with the exposed photosensitive sheet to produce the positive transfer image on the second sheet when distributed between the two sheets; means including a leader for coupling the two sheets and withdrawing the sheets in superposition from the container; and positive trapping means integral the trailing opposed surface of the second sheet element for engaging and retaining fluid agent overrun upon superpositioning of the sheet elements and distribution of the fluid agent.

The positive trapping means employed should be simple and inexpensive to fabricate, so that it does not add appreciably to the cost of the film unit, and it should be easy to assemble and employ in order to contribute in a practical manner to the efficient operation of the film unit, and film pack and camera employing same. The trapping means may comprise an elongated trailer sheet including a first section having a leading edge attached transversely the trailing edge of the second sheet element. The trailer sheet may be medially folded to provide a second section including a resilient flap extending transverse the first section and within the laminate formed upon superposition of the first and second sheet elements. The flap possesses sufficient resiliency to provide an opening intermediate the leading edges of the first and second sections of the trailer sheet and within the trailing end of the laminate. The cavity formed is thus adapted to trap and retain fluid processing composition entering the orifice intermediate the first and second sections of the trailer sheet.

The elongated trailer sheet may comprise, in whole or in part, paper, and preferably a moisture resistant paper, a polymeric material such as polyethylene and/or a thin metallic sheet material such as aluminum, and may comprise and/or retain one or more components adapted to react with and/or absorb the fluid processing composition entering the trap cavity.

Where the chosen trailer sheet material possesses less resiliency than desired, for example, where a paper material is employed, spring means may be affixed on, and may extend, in whole or in part, transverse the second section and intermediate the first and second sections of the trailer sheet, for maintaining the leading marginal edges in an open fluid composition receptive position. Such spring means may comprise, for example, an elongated curved or leaf spring member extending transverse the second section intermediate the first and second sections and may include an elongated metallic foil strip spring member.

It will be recognized that, as desired, the trapping means may extend in whole or in part, lengthwise the trailing edge or edges retaining same, as dictated by the position and amount of fluid processing composition overrun.

The preferred form of film pack embodying the designated film units comprises a plurality of the film units, each adapted to be exposed and processed in a camera for producing a positive photographic transfer print, enclosed in a light-proof container or magazine which allows the film units to be sequentially exposed. The container includes a forward wall having an exposure aperture therein and an opening in one end through which film units can be withdrawn one at a time with the photosensitive and second sheet elements of each film unit in superposed relation. The photosensitive sheets of the film units are positioned together within the container underlying the exposure aperture and the second sheets are arranged together apart from and behind the photosensitive elements adjacent the opening through which the film units are withdrawn so that following the exposure of the photosensitive element of each film unit, the photosensitive element is moved, by drawing on the leader of the film unit, into superposition with the second element of the film unit and the film unit is then withdrawn from the container through the opening. The film pack is initially provided with a cover element or sheet mounted within the container and extending across the exposure aperture for closing the aperture against the admission of light. The cover element also includes a leader extending from the container through the opening and being removable therethrough.

The film pack is employed by being positioned in a camera, including a pair of juxtaposed pressure-applying members, with the opening located adjacent the pressure-applying members and the exposure aperture disposed approximately in the exposure plane of the camera. The leaders of the film units and cover element extend from the pack and from the camera where the last-mentioned leader may be grasped for withdrawing the cover element from the pack and camera to allow the photosensitive sheets of the pack to be exposed. After the photosensitive sheet of each successive film unit is exposed, that film unit is then withdrawn from the container and camera between the pressure-applying members by withdrawing the leader of the first film unit and of successive film units from the container and camera.

Reference is now made to FIGS. 1 through 5 of the drawings wherein there are illustrated film units and an assemblage of film units in the form of a film pack. Each film unit, designated 10, comprises a generally rectangular photosensitive sheet 12 and a second or print-receiving sheet 14. Both of these sheets comprise a support which is opaque to light actinic to the photosensitive material of the photosensitive sheet. This photosensitive material comprises a layer of any of the conventional photographic recording media, gelatino silver halide emulsions being the preferred material, carried on a light-opaque flexible sheet such as paper, organic plastics and the like. The second or print-receiving sheet may merely serve to aid in the distribution of a processing fluid in contact with the photosensitive layer or, in the preferred form of film unit, comprises means for supporting a transfer image formed, for example, by a silver halide diffusion-transfer reversal process. Attached to the leading edge of photosensitive sheet 12 is a leader sheet 16 having a first section 18 at which leader sheet 16 is coupled with the photosensitive sheet. First section 18 is approximately equal in width to the photosensitive sheet and provides means for mounting a rupturable container 22 of processing fluid. Leader sheet 16 also includes a tapered end section 20. Second sheet 14 is mounted on a carrier sheet 24 having an intermediate section 26 approximately equal in width to second sheet 14 and having a generally rectangular opening 28 therein defining the area of the second sheet in which image formation occurs. Second sheet 14 is secured to intermediate section 26 so that the portions of the intermediate section bordering on opening 28 provide a mask for defining the image area and cooperating in spreading of the processing fluid. Side guides 33 are secured to the lateral edges of carrier sheet 24 and extend the length of second sheet 14 whereby to provide a gap between sheet 12 and sheet 14 and retention of the processing fluid intermediate side guides 33, upon formation of the laminate. Carrier sheet 24 includes a leading end section 30 having a tapered end portion 32 similar to tapered end section 20 and secured thereto intermediate the ends of tapered end section 20 and tapered end portion 32 of leading end section 30. Tapered end section 20 and end portion 32 cooperate to define the leading end section of the film unit which is advanced between the pressure-applying members.

Figure 1:
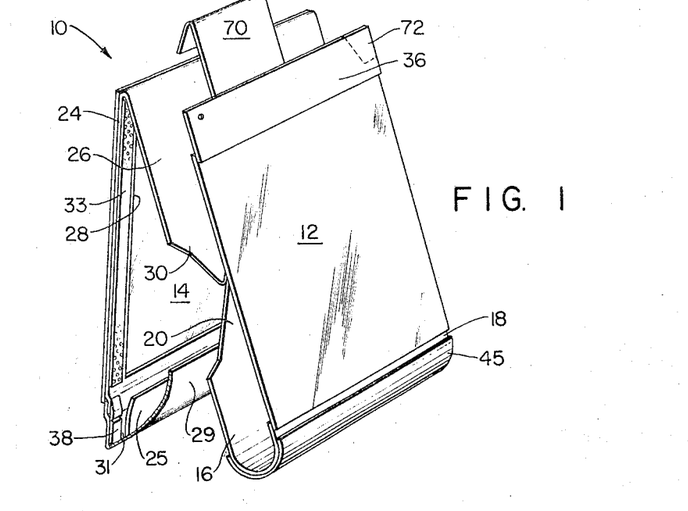
FIGURE 1 is a fragmentary perspective view of a photographic film unit embodying the invention.
Figure 2:
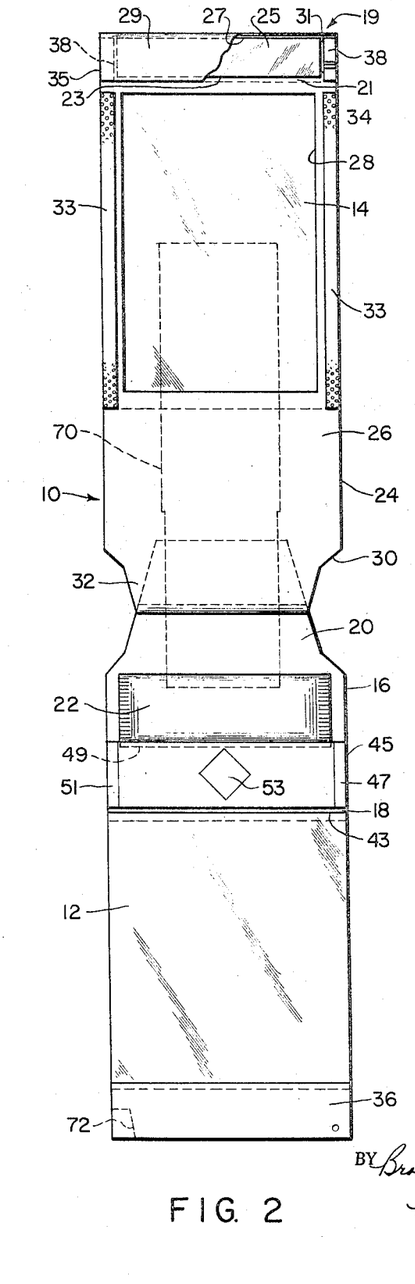
FIG. 2 is a plan view of the film unit of FIGURE 1.
Figure 5:
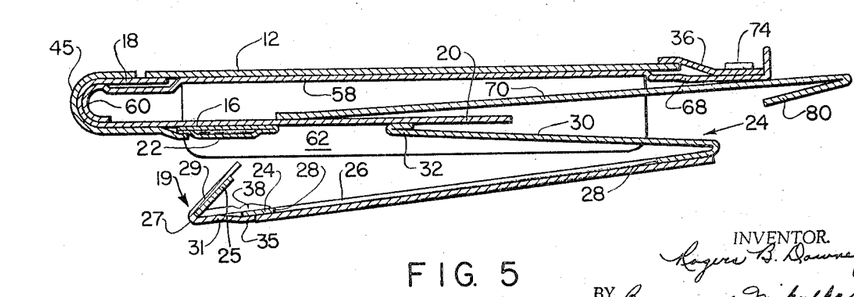
FIG. 5 is a diagrammatic sectional view taken substantially midway between the sides of the film pack showing one film unit with the components thereof spaced apart to more clearly illustrate the construction and arrangement of the film unit.

The length of leader sheet 16 between the leading edge of photosensitive sheet 12 and the point of attachment of the leader sheet to carrier sheet 24 is substantially equal to the length of carrier sheet 24 between its point of attachment to the leader sheet and the leading edge of second sheet 14. It is by virtue of this arrangement that the photosensitive and second sheets are superposed in registered relation during the processing of the film unit.

Liquid confining means 19 comprises an elongated trailer sheet 35 provided secured to the trailing edge of carrier sheet 24 and divided into first section 31 and second resilient flap section 29 by medium fold 27, whereby flap 29 extends transverse first section 31, within the laminate formed upon superpositioning of the photosensitive and second sheets in registered relation, to trap any excess processing fluid which may be carried beyond the trailing ends of the registered photosensitive and second sheets, during distribution of the processing fluid. Second section 29 possesses elongated curved or leaf spring member 25 extending transverse section 29 and intermediate this section and first section 31 for preventing closure of marginal edges 23 and 21 during formation of the laminate.

A second trailer sheet 36 is provided attached to the trailing edge of photosensitive sheet 12, substantially equal to the length of first section 31 of trailer sheet 35, and extends in contiguous opposed contact with the external surface of second section 29, of sheet 35, upon superpositioning of the respective photosensitive and nonphotosensitive sheet elements.

Distribution of the processing fluid, as noted, is effected by advancing the photosensitive and second sheets and container of processing fluid in superposition relative to and between a pair of juxtaposed pressure-applying members. The members apply compressive pressure to the sheets progressively, commencing in the area of the container, to cause the ejection of the fluid contents of the container between the sheets and the spreading of the fluid in a layer between and in contact with the sheets. To aid in trapping of excess fluid, spacing members 38 may be provided on trailing end first section 31 of trailer sheet 35, adjacent the margins thereof, for spacing apart the pressure-applying members to enhance the gap between first section 31 and second section 29, in which any excess processing fluid is collected and retained.

The rupturable container is of the type shown and described in Patent No. 2,543,181, issued February 27, 1951, in the name of Edwin H. Land, and comprises a rectangular blank of fluid- and air-impervious sheet material folded longitudinally upon itself to form two walls which are sealed to one another along their longitudinal and end margins to form a cavity in which the processing fluid is contained. The longitudinal marginal seal 41 is made weaker than the end seal so as to become unsealed in response to hydraulic pressure generated within the fluid contents of the container by the application of compressive pressure to the walls of the container. Container 22 is mounted on first section 18 of leader sheet 16 with this longitudinal marginal seal directed toward the leading edge 43 of the photosensitive sheet. Bib sheet 45 is secured to leader sheet 16 at lateral edges 47 and 51, center area 53, and to lateral edge 49 of container 22, and facilitates restricted unidirectional flow of fluid contents 39 upon compressive rupture of container 22.

The fluid contents 39 of the container are preferably adapted to effect the formation of a transfer image on print-receiving sheet 14 in the area thereof defined by opening 28 in carrier sheet 24. For details concerning the composition of the fluid and materials useful for the photosensitive and print-receiving sheets and the processes performed by such materials, reference may be had to the above-mentioned U.S. Patent No. 2,543,181; U.S. Patent No. 2,662,822, issued December 15, 1953, in the name of Edwin H. Land; and U.S. Patent No. 2,983,606, issued May 9, 1961, in the name of Howard G. Rogers.

Figures 3, 4, 10:
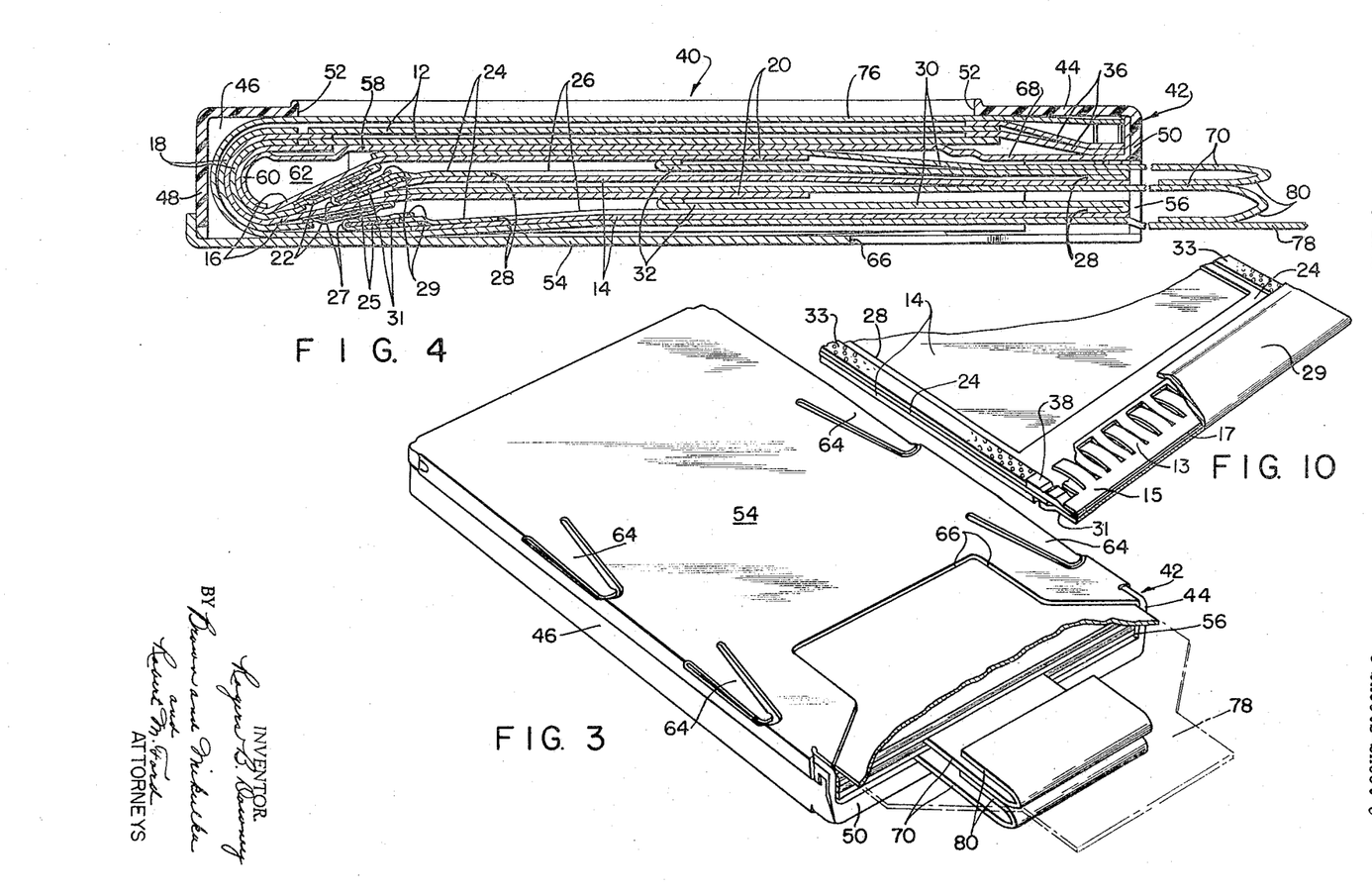
FIG. 3 is a perspective view of a film pack comprising an assemblage of film units.
FIG. 4 is a longitudinal sectional view taken substantially midway between the sides of the film pack of FIG. 3.
FIG. 10 is a fragmentary perspective view of a film unit, similar to that of FIGS. 1, 2 and 5, illustrating another embodiment of the invention.

A film pack or assemblage of film units 10 is shown in FIGS. 3 and 4 of the drawings. This film pack, designated 40, comprises a generally parallelepiped-shaped container or box 42 for holding and enclosing a plurality of film units 10. Container 42 is shown as comprising two sections, including a forward section having a forward wall 44, side walls 46, a trailing end wall 48, and a leading end wall 50. Forward wall 44 is provided with a generally rectangular exposure aperture 52 for transmitting light for exposing the photosensitive sheets of film units carried within the container. Leading end wall 50 comprises only a partial wall, i.e., it does not extend rearwardly to the same extent as the side walls, which cooperates with the rear section of the container to provide a passage 56 at the leading end of the container through which film units 10 carried by the container are withdrawn. The rear section of the container comprises a rear wall 54 secured to side walls 46 and formed preferably of a resilient sheet metal.

The arrangement of each film unit within container 42 is illustrated in FIGS. 1 and 5; and the arrangement of a plurality of film units (two are shown) is illustrated in FIG. 4. Each film unit is arranged with the photosensitive and second sheets in overlying relation with the photosensitive surface of the photosensitive sheet facing outward and with the surface of the print-receiving sheet which is superposed therewith, during processing, facing inwardly in the same direction. Leader sheet 16 is folded or curved adjacent the leading edge of photosensitive sheet 12 intermediate that edge and container 22, and carrier sheet 24 is similarly folded adjacent the leading edge of second sheet 14 so that the portions of the leader sheet and carrier sheet which connect the photosensitive and second sheets lie therebetween; and the leading and trailing ends of the photosensitive sheet are disposed adjacent, respectively, the trailing and leading ends of the second sheet. The film pack is provided with a generally flat, rectangular pressure plate 58 located intermediate photosensitive sheet 12 and the other portions of the film unit for supporting the photosensitive sheet against the inner surface of forward wall 44 in position for exposure through aperture 52. Pressure plate 58 includes a rolled end section 60 around which extends the curved portion of leader sheet 16. Rolled end section 60 is provided for guiding photosensitive sheet 12 around the end of the pressure plate in a manner to be described hereinafter. The major portion of first section 18 of leader sheet 16, rupturable container 22 mounted thereon, tapered section 20 and the leading end section 30 of carrier sheet 24 are located behind pressure plate 58 between the latter and second sheet 14. Pressure plate 58 is provided with lateral flanges 62 disposed adjacent side walls 46 of the container. Rear wall 54 of the housing is provided with springs 64 formed from the rear wall and biased inwardly for engaging lateral flanges 62 and biasing pressure plate 58 toward forward wall 44 to retain the photosensitive sheet in position for exposure. Rear wall 54 is also provided with a U-shaped opening or enlarged notch 66 in the end portion thereof adjacent opening 56, the purpose of opening 66 to be described hereinafter.

Figure 7:
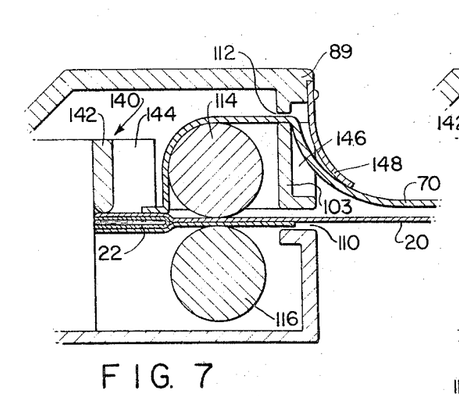
FIG. 7 is a fragmentary sectional view, similar to FIG. 6, illustrating initiation of and initial passage of one film unit between a pair of opposed pressure-applying rolls during removal of the film unit from the camera apparatus of FIG. 6, subsequent to photoexposure.

The means for withdrawing each film unit 10 from container 42 with the photosensitive and print-receiving sheets 12 and 14 in superposition and advancing tapered end section 20 between a pair of pressure-applying members comprises a relatively narrow elongated leader 70 secured at the trailing end of the leader to tapered end section 20 intermediate first section 18 and the point of attachment of the tapered end section to tapered end portion 32. Leader 70 is of substantially uniform width throughout its length. The areas of adherence of leader 70 to tapered end section 20 extend substantially in the direction of movement of the leader, and comprise any suitable adhesive material which will form a bond, preferably at least equal in strength to the sheet materials (paper) comprising the leader and tapered end section, sufficient in resistance to the application of tension, in a direction of the plane of tapered end section 20, to prevent shearing. The adhesive bond is such that the application of a suitable shearing force to leader 20, effected by applying tension to the leader in a direction at an angle from the plane of tapered end section 20, causes leader 70 to disengage from contact with tapered end section 20. By virtue of this construction, as long as the leader and film unit coupled therewith are being moved in approximately the same direction, then the leader is in tension and does not fail. However, when the direction of movement of leader 70 and tapered end section 20 diverges sufficiently (as shown in FIG. 7) the trailing end section of the leader is subjected to a shearing force which causes the leader to tear and thereby become detached from tapered end section 20.

Leader 70 extends from container 42 through opening 56 therein and, when drawn from the container, advances a photosensitive sheet 12 around rolled end section 60 of pressure plate 58 into superposition with a second sheet 14 and then advances the two sheets in superposition within the container towards opening 56. As leader 70 commences to advance towards opening 56, tapered end section 32 of carrier sheet 24 is required to commence rolling upon itself toward the opening in response to movement of tapered end section 20 of leader sheet 16 toward the same opening. It is for this reason that section 20 and portion 32 are tapered, since this provides for the weakest portion of end portion 32 in the area where the end portion is required to commence rolling. Means are also provided for preventing movement of photosensitive sheets underlying the foremost photosensitive sheet as the latter is moved from exposure position around the end of the pressure plate. This means comprises an end section 68 of pressure plate 58 to which are attached corner portions 72 of trailing end sections 36. Corner portions 72 may be precut, as shown, to insure separation from the remainder of trailing end section 34 and may be secured to end section 68 of the pressure plate by suitable means such as staples 74.

Film pack 40 is provided with means for initially sealing aperture 52 against the admission of light until the pack has been loaded into the camera in which it is to be employed. This light-sealing means comprises a cover sheet 76 (double) of a light-impervious material located between the foremost photosensitive sheet and forward wall 44 across opening 52. Cover sheet 76 extends around the curved end of the pressure plate behind the latter to a position against rear wall 54 with the leading end of the cover sheet located adjacent passage 56. An elongated leader section 78, similar to leader 70, provides means for withdrawing cover sheet 76 from container 42 after the container has been loaded into a camera.

The film units incorporating the invention and comprising film pack 40 are adapted to be employed in a photographic apparatus such as hand-held camera 86, illustrated in FIGS. 6 through 9 of the drawings. Camera 86 comprises a housing including a forward section 88 having a forward wall 90 with a recessed or reentrant section 92 and an aperture 94 in the reentrant section for transmitting light for exposing the photosensitive sheets of a film pack positioned for exposure within the camera. A hinged door 96 is provided for covering recessed section 92 and for mounting a conventional lens and shutter assembly 98, the latter being connected to recessed section 92 by a collapsible bellows 100 secured at one end to the lens and shutter assembly and secured at its other end to the recessed section in surrounding relation to aperture 94. In lieu of door 96, lens and shutter assembly 98 and bellows 100, the camera housing can be constructed in the form of a camera back or film pack adapter intended to be mounted on or coupled with a camera or other photographic exposure device.

Figure 6:
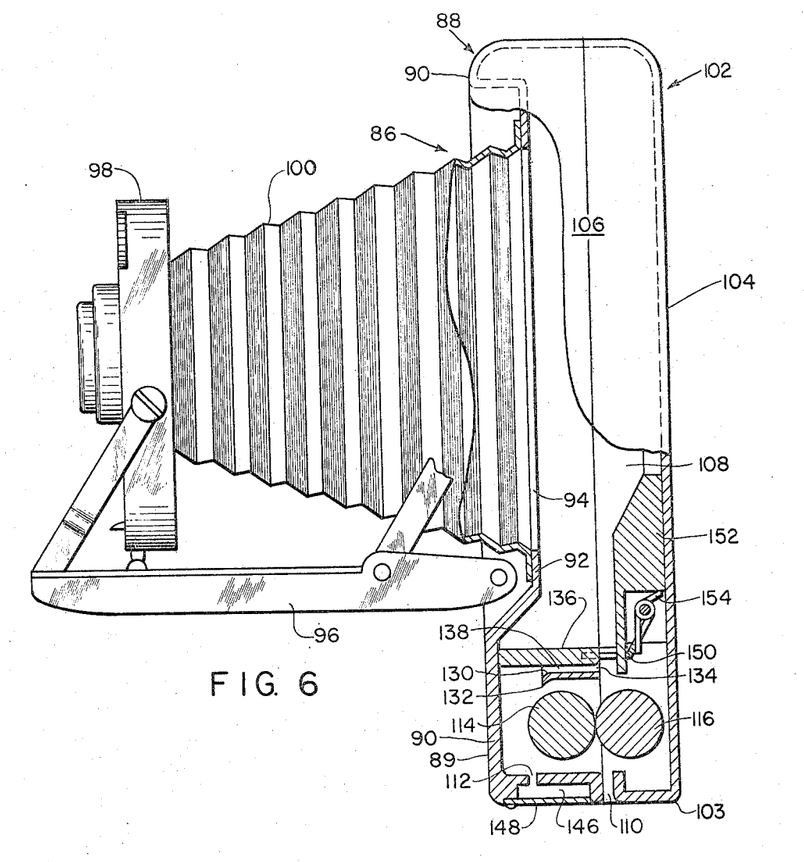
FIG. 6 is an elevational view, partially in section, of photographic apparatus in the form of a camera for employing film units embodying the invention.

The camera housing includes a rear section 102 having a rear wall 104 and side walls 106 cooperating with forward housing section 88 to provide a chamber 108 to the rear of forward wall 90 and aperture 94 for containing the film pack in position for exposure through aperture 94. Film pack 40 is mounted within chamber 108 with the wall of the pack located against the rear surface of reentrant section 92 and with aperture 52 in the forward wall of the pack aligned with aperture 94. Rear housing section 102 is preferably pivotably secured to forward housing section 88 adjacent one end of the housing, herein shown and designated for purposes of description as the upper end, by a hinge which permits the two housing sections to be moved apart from one another to allow loading of a film pack into chamber 108. The camera housing includes a lower end wall comprising end wall 89 on forward housing section 88 and another end wall 103 on rear housing section 102. A film withdrawal passage 110 is provided in lower end wall 103 of the housing to permit withdrawal of a film unit from the housing. Suitable latch means (not shown) of a conventional type are also provided in the lower portion of the housing for retaining the two housing sections together in the closed or operative position shown in the drawings.

Camera 86 includes a pair of juxtaposed pressure-applying members in the form of pressure-applying rolls 114 and 116 mounted within chamber 108 adjacent film withdrawal passage 110. Pressure-applying rolls 114 and 116 are mounted for pivotal movement with their axes substantially in a common plane, and resilient means are provided for biasing the rolls toward one another into juxtaposition so as to apply compressive pressure to a film unit during movement thereof between the rolls. The pressure-applying rolls cooperate to form a convergent (and divergent) passage through which the film unit is moved for effecting the processing of the film unit, and this passage between the pressure-applying rolls is located in substantial alignment with withdrawal passage 110. In the arrangement of the pressure-applying rolls shown in the drawings, both rolls are mounted on rear housing section 102 so that when the housing sections are pivoted apart from one another, an assemblage of film units may be loaded into the camera with the leaders thereof extending from the camera past and to one side (forward) of the pressure-applying rolls. Portions of end walls 89 and 103 cooperate to define an opening 112 between the forward and rear housing sections through which the leaders extend from the camera housing.

Camera 86 includes means for guiding tapered end section 20 of film unit 10 between pressure-applying rolls 114 and 116 in response to withdrawal movement of leader 70 past roll 114 to the front thereof and through opening 112. In the form shown in FIG. 6, this guide means comprises a guide bar 130 mounted on rear housing section 102 closely adjacent roll 114 and having a substantially straight rear edge extending from side to side of the camera housing and lying substantially in a plane through the convergent passage between pressure-applying rolls 114 and 116, i.e., tangent to the rolls. An intermediate section 132 of guide bar 130, comprising the forward edge of the guide bar and approximately equal in length to the width of leader 70, is curved toward roll 114 and is located with its forwardmost edge approximately in line with the forwardmost portion of roll 114. A pair of guide members 134 are mounted on the end sections of guide bar 130 adjacent intermediate section 132. The rear surfaces of guide members 134 are located in the plane of the rear edge of guide bar 130 and the two members are provided with facing end surfaces spaced from one another by a distance slightly greater than the width of leader 70. A guide plate 136, approximately equal in length to the width of leader 70, is mounted on forward housing section 88, and extends toward the rear of the camera intermediate guide members 134 adjacent guide bar 130. The rearmost edge of guide plate 136 may be curved, as shown, and is located substantially in the plane of the rear edge of guide bar 130 and rear surfaces of guide members 134. Intermediate section 132 of guide bar 130, guide members 134 and guide plate 136 cooperate with one another to define a guide passage 138 extending generally in a direction from front to rear of the camera and having a width, measured from side to side of the camera, just slightly greater than the width of leader 70, so that the leader may be moved through passage 138. It will be noted that tapered end section 20, at the leading edge thereof, is wider than leader 70 so that tapered end section 20 is unable to enter passage 138. The rear edges of guide bar 130 and guide plate 136 and the rear surfaces of guide members 134 function to support and guide tapered end section 20 of the film unit into the convergent passage between pressure-applying rolls 114 and 116.

In the loading and operation of the camera, the forward and rear housing sections are pivoted apart from one another and a film pack 40 is positioned within the forward housing section with the forward wall of the pack resting against section 92 of the forward wall of forward housing section 88, and with leaders 70 and leader 78 projecting from the pack extending across and to the rear of guide plate 136 and end wall 89. Rear housing section 102 is then pivoted into the operative position shown, causing the intermediate section 132 of guide bar 130 to engage the leaders displacing them forwardly so that they extend through passage 138 toward the forward wall of the camera, past pressure-applying roll 114 and through opening 112 in end wall 89. As a leader 70 is withdrawn from the camera through opening 112, tapered end section 20 is withdrawn from the pack and, being unable to enter passage 138, is guided by the guide bar, guide members and guide plate into the convergent passage between the pressure-applying rolls.

Another form of guide means, designated 140, is illustrated in FIG. 7 of the drawings. Guide means 140 is similar in construction to the guide means shown in FIG. 6 and comprises a guide bar 142 and two guide members 144. Guide bar 130 and guide members 134, and the guide bar and guide members of guide means 140 may comprise a single element or three separate elements. Guide means 140 is mounted on forward housing section 88 adjacent forward roll 114 with the rearmost surfaces of guide members 144 disposed approximately in a plane tangent to the surfaces of rolls 114 and 116. The spacing between the facing surfaces of guide members 144 is slightly greater than the width of leader 70 but less than the narrowest portion of tapered end section 20 so that leader 70 may pass between guide members 144 while tapered end section 20 is supported on and guided by members 144 between the pressure-applying rolls. The intermediate section of guide bar 142 and guide members 144 cooperate with one another and roll 114 to define what may be termed a passage through which leader 70 is guided to the front of roll 114 and through opening 112.

Film withdrawal passage 110, in the lower end wall of the camera housing, is at equal in width to the width of the film unit, whereas opening 112 need be of a width only sufficient to allow the passage of leader 70. It is desirable to allow only one leader at a time to project from the camera where the leader may be grasped; and this is desirable to prevent the operator from accidentally pulling the wrong leader, or pulling more than one leader at a time. For this purpose, end wall 103 is provided with a recess, designated 146, adjacent passage 112 for holding the leading end sections of leaders 70. The leading end sections, designated 80, of leader 70, are folded back upon themselves and each leading end section is detachably adhered to the leader of the preceding film unit, with the leading end section 80 of the first (to be exposed) film unit being attached to leader 78. The folded leading end sections 80 of leaders 70 are contained within recess 146 which is provided with a resilient cover element 148. As leader 78 or a leader 70 is withdrawn through opening 112, the leading end section 80 of the next succeeding leader 70 is unfolded and withdrawn from recess 146 where the leading end section may be grasped for pulling the leader from the camera. By virtue of this arrangement, only one leader at a time extends outside of recess 146 in position to be engaged and withdrawn.

As a photosensitive sheet 12 is being drawn within the pack around curved end 60 of the pressure plate into superposed relation with a second sheet 14, the second sheet tends to move due, for example, to friction between the various sheet materials. Means are provided in the camera for restraining the second sheets 14 against such movement and, in the form shown, comprise an elongated bar 150 pivotally mounted intermediate its ends in a housing 152 mounted on rear wall 104 within chamber 108. Bar 150 is biased by a spring 154 into a forward position with the end sections of bar 150 extending forwardly across the end portions of withdrawal passage 56 in container 42 toward and into engagement with guide members 134. The end sections in this position, engage the leading edges of second sheets 14 adjacent the sides thereof for preventing movement of the second sheets toward the pressure-applying rolls. Spring 154 is of sufficient strength to resist the relatively small force exerted by the second sheets due to frictional engagement with the other sheets, but permits bar 150 to be pivoted rearwardly sufficiently to allow the withdrawal of a second sheet 14 when the latter is pulled from container 42 in superposition with a photosensitive sheet 12. The U-shaped opening 66 in rear wall 54 (mentioned earlier) is provided to accommodate housing 152, a portion of which extends into container 42 through opening 66.

In the operation of the film unit of the invention, leader 70 is pulled from the camera advancing tapered end section 20 and tapered end portion 32 between pressure-applying rolls 114 and 116 to the position shown in FIG. 7 at which leader 70 extends from its point of attachment to tapered end section 20 at almost a right angle from the plane of the tapered end section. At this position, the leading end of tapered end section 20 projects through passage 110 a sufficient distance to permit the tapered end section to be grasped, and the application of a continued pulling force on leader 70 results in the exertion of a shearing force to leader 70 at the areas where the leader is attached to the tapered end section and results in separation of the leader at these areas.

Figure 8:
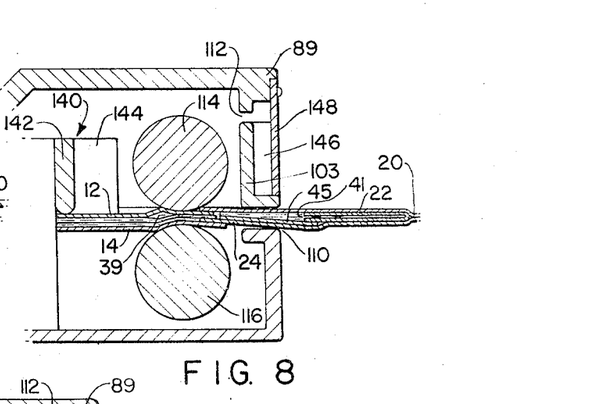
FIG. 8 is a fragmentary sectional view, similar to FIG. 7, illustrating further passage of the film unit between the pair of opposed pressure rolls, rupture of the frangible container and distribution of its fluid processing composition contents between, and in contact with, the opposed surfaces of the superposed sheet elements of the film unit.

Application of withdrawing force on tapered end section 20, advancing photosensitive sheet 12, second sheet 14 and container 22 between pressure-applying rolls 114 and 116 to the position shown in FIG. 8 provides rupture of the longitudinal marginal seal 41 of container 22 and unidirectional release of fluid processing composition 39 between and in contact with opposed surfaces of photosensitive sheet 12 and sheet 14.

Figure 9:
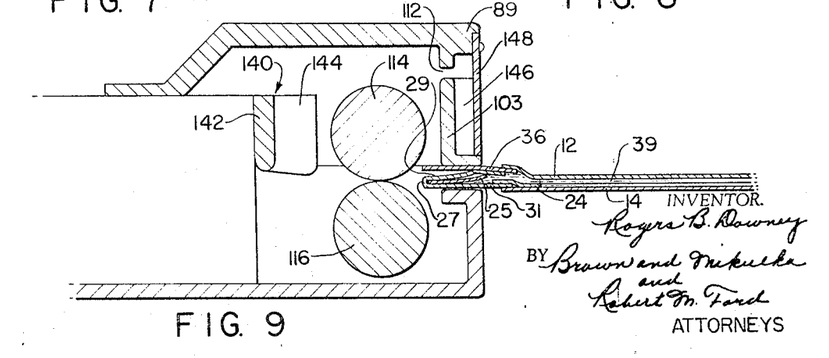
FIG. 9 is a fragmentary sectional view, similar to FIG. 8, illustrating completion of the passage of the film unit between the pair of opposed pressure rolls, the laminate formed by distribution of the fluid processing composition between the superposed sheet elements, and trapping or retention of the fluid processing compositions overrun within the confines of the designated trapping means.

Continued withdrawing force on tapered end section 20 between pressure-applying rolls 114 and 116 to the position shown in FIG. 9 provides positive engagement between processing composition 39 and liquid confining means 19 previously described, thereby retaining distribution of excess processing composition 39 within the perimeters formed by the liquid confining means.

In the form shown in FIG. 10, the liquid confining means include trailer sheet 35 secured to the trailing edge of carrier sheet 24 and divided into first section 31 and second section 29 by medium fold 27. Second section 29 possesses elongated spring member 17 mounted on and extending transverse section 29 and intermediate this section and first section 31. Spring member 17 includes spring plate 15 including a section provided with a plurality of substantially parallel and uniformly spaced spring fingers 13 or projections deformed outwardly from spring plate 15. Each of the spring fingers functions as a substantially independent, low-rate cantilever spring and, in the aggregate, the plurality of spring fingers 13 may provide a substantially uniform and uniformly distributed spring force for biasing flap 29 from immediate contact with section 31.

It has been additionally discovered that when fluid processing composition 39 comprises an aqueous alkaline processing solution, it is preferred that a permeable acid-containing polymeric layer or stratum, adapted to retain and neutralize the aqueous alkaline fluid processing composition overrun upon contact with the polymeric layer, be disposed within the confines of the cavity formed by first section 31 and second section 29, and preferably on the surface of first section 31 and/or second section 29.

As specific examples of a wide variety of permeable polymeric materials adapted for employment in the practice of the present invention, mention may be made of, for example, natural resins, such as starch, gelatin, dextrin, etc., and synthetic resin such as polyethylene oxide, polyvinyl alcohol, hydroxyethyl cellulose, and including synthetic acid resins such as polyacrylic acid and those specifically mentioned hereinafter, etc.

Of the aforementioned polymeric materials starch has been found to be a particularly preferred polymer in that a film or layer, comprising same possesses a permeability to alkaline processing composition such that retention and neutralization by an incorporated acid is readily achieved.

As specific examples of acids particularly adapted for employment, mention may be made of water-soluble, relatively low molecular weight acids which preferably exist in the solid or particulate state, within the ambient temperature range of photographic film usage, such as, for example, citric, ascorbic, sulfamic, oxalic, maleic, succinic, boric, malonic, etc.; the anhydrides thereof, etc.; and/or acid sols such as $(NH_4)_2HPO_4$, $NH_4H_2PO_4$, $NH_4HSO_4$, etc.

Of the aforementioned acids, sulfamic acid has been found to be a particularly preferred material in that it is a solid within the ambient temperature range of film unit employment, a strong acid and readily water soluble in large concentrations.

Where desired, the permeable polymeric material may contain integral acid groups such as carboxylic, sulfonic, carboxylic acid anhydride, etc., groups and may, in addition, also releasably retain one or more of the previously mentioned acids. As examples of such permeable polymeric acids, mention may be made of, for example, dibasic acid half-ester derivatives of cellulose which derivatives contain free carboxyl groups, e.g., cellulose acetate hydrogen phthalate, cellulose acetate hydrogen glutarate, cellulose acetate hydrogen succinate, ethyl cellulose hydrogen succinate, ethyl cellulose acetate hydrogen succinate, cellulose acetate hydrogen succinate hydrogen phthalate; ether and ester derivatives of cellulose modified with sulfoanhydrides, e.g., with orthosulfobenzoic anhydride; polystyrene sulfonic acid; carboxymethyl cellulose; polyvinyl hydrogen phthalate; polyvinyl acetate hydrogen phthalate; polyacrylic acid; acetals of polyvinyl alcohol with carboxy or sulfo substituted aldehydes, e.g., o-, m-, or p-benzaldehyde sulfonic acid or carboxylic acid; partial esters of ethylene/maleic anhydride copolymers; partial esters of methylvinyl ether/maleic anhydride copolymers; etc.

For employment in transfer processes of the types disclosed in the aforementioned U.S. Patents Nos. 2,543,181; 2,662,822 and 2,983,606, the processing composition may preferably possess a pH of about 12 or more. Thus, the acid-containing polymer layer preferably should contain at least sufficient acid potential and permeability to effect a reduction in the pH of the fluid overrun from a pH of about 12 to 14 to a pH preferably about 5 to 8 upon contact therebetween.

It will be recognized that the aforementioned acid-containing polymeric layer may be employed in combination with an alkali neutralizing elongated metallic trailer sheet such as, for example, an aluminum sheet.

Since certain changes may be made in the above product without departing from the scope of the invention herein involved, it is intended that all matter contained in the above description or shown in the accompanying drawings shall be interpreted as illustrative and not in a limiting sense.

What is claimed is:

1. A photographic film unit which is adapted to be processed by passing said unit between a pair of juxtaposed pressure-applying members which comprises, in combination, a first photosensitive sheet element, a second non-photosensitive sheet element and a rupturable container retaining a fluid processing composition, said sheet elements arranged for biasing into superposed relationship with said container positioned intermediate said sheet elements transverse a first leading edge thereof, to effect unidirectional discharge of said container's contents between and in contact with opposed surfaces of said elements upon application of compressive force to said container, liquid confining means attached to the trailing edge of said second sheet element, said liquid confining means comprising an elongated sheet including a first section having a leading edge attached transversely said trailing edge, said elongated sheet medially folded to provide a second section extending transverse said first section within the laminate formed upon superpositioning of said first and said second sheet elements to provide retention of said processing composition entering intermediate said first and said second sections of said elongated sheet, a spring member attached to one of said first and said second sections and extending intermediate said sections for biasing said second section from juxtaposed contact with said first section.

2. A photographic film unit as defined in claim 1, wherein said elongated sheet comprises paper and said second section of said elongated sheet has a leaf spring member attached on and extending transverse said second section intermediate said first and said second sections.

3. A photographic film unit as defined in claim 2, wherein said leaf spring member comprises an elongated metallic foil leaf spring.

4. A photographic film unit as defined in claim 1, wherein said elongated sheet comprises aluminum.

5. A photographic film unit as defined in claim 1, wherein said elongated sheet comprises paper and said second section of said elongated sheet has a spring member attached on and extending transverse said second section intermediate said first and said second sections, said spring member comprising a spring plate having a plurality of substantially parallel projections extending intermediate said spring plate and said first section.

6. A photographic film unit as defined in claim 5, wherein each of said projections extend in substantially parallel relation from an anchored position on said spring plate toward said trailing edge.

No references cited.

NORMAN G. TORCHIN, *Primary Examiner.*

J. H. RAUBITSCHEK, *Assistant Examiner.*